Figure 1:
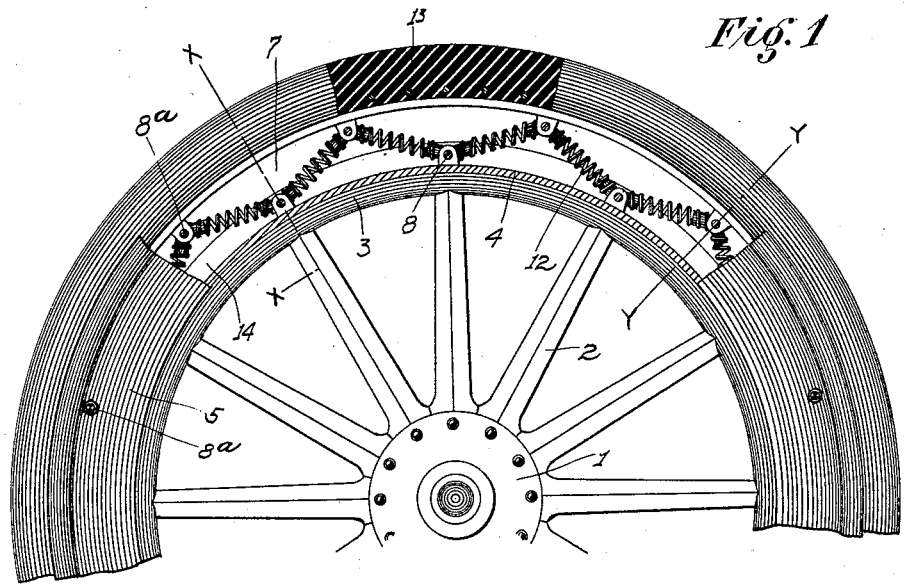

D. L. CROSBIE.
RESILIENT WHEEL.
APPLICATION FILED OCT. 10, 1911.

1,058,221.

Patented Apr. 8, 1913.

Witnesses

Inventor
D. L. Crosbie
Attorney

UNITED STATES PATENT OFFICE.

DANIEL L. CROSBIE, OF SACRAMENTO, CALIFORNIA, ASSIGNOR OF ONE-THIRD TO JOSEPH D. CORNELL AND ONE-THIRD TO V. J. BARTELS, BOTH OF SACRAMENTO, CALIFORNIA.

RESILIENT WHEEL.

1,058,221.  Specification of Letters Patent.  Patented Apr. 8, 1913.

Application filed October 10, 1911. Serial No. 653,767.

*To all whom it may concern:*

Be it known that I, DANIEL L. CROSBIE, a citizen of the United States, residing at Sacramento, in the county of Sacramento, State of California, have invented certain new and useful Improvements in Resilient Wheels; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in vehicle wheels, and particularly it is the object of the invention to produce a resilient spring wheel which will supplant the pneumatic tire wheel now in use and at the same time give the same cushion and resilient effect as does such pneumatic wheel when the same encounters rough or uneven roads.

A further object of the invention is to produce a simple and inexpensive device, and yet one which will be exceedingly effective for the purposes for which it is designed.

These objects I accomplish by means of such structure and relative arrangement of parts as will fully appear by a perusal of the following specification and claim, the main object of the invention being more fully disclosed in my application for patent dated January 16, 1911, Serial No. 602,828, allowed March 6, 1911; the particular invention shown and described here being certain improved details of structure over the structure shown in such above mentioned application for patent.

In the drawings similar characters of reference indicate corresponding parts in the several views.

Figure 2:
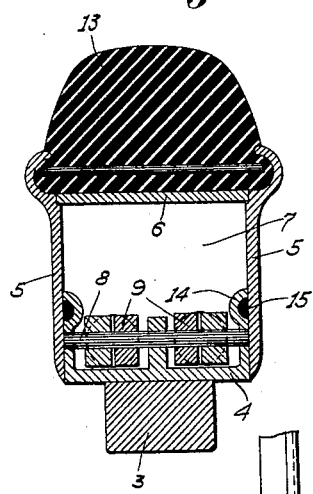
Figure 3:
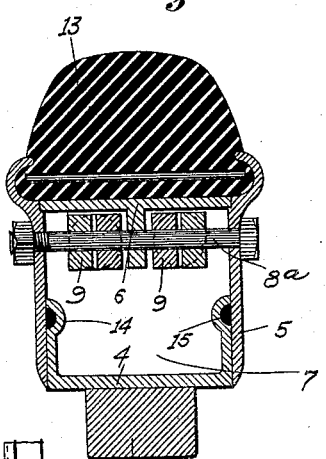
Figure 4:
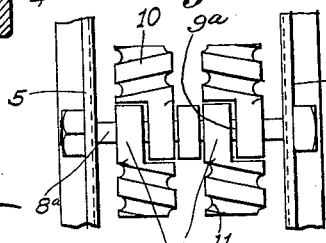

Figure 1 is a side elevation partly broken out showing my complete wheel. Fig. 2 is a sectional view taken on a line X—X of Fig. 1. Fig. 3 is a sectional view taken on a line Y—Y of Fig. 1. Fig. 4 is a top plan view of the spring retaining structure.

Referring now more particularly to the characters of reference on the drawings, 1 designates the hub of a wheel, 2 the spokes thereof and 3 the rim or felly.

In applying my improved structure I first provide a channeled iron tire 4 for said felly or rim 3 and over this are slidable side members 5 of an auxiliary tire 6, there being a space 7 intermediate said members 4 and 6. Projecting across from the sides of the member 4 and from the members 5 near the tire 6 are pins 8 and bolts $8^a$ respectively disposed in alternate order with respect to each other, and mounted on said pins 8 and bolts $8^a$ are rocking arms 9, each arm having a projecting lug 10, each of said lugs 10 having a substantially screw shaped groove 11 in its periphery. The pins 8, as will appear from Fig. 2, are loosely disposed in position and are adapted to be held in such position by means of the side members 5. Each of the arms 9 has a cut-in recess $9^a$ whereby the ends of two of said arms projecting in opposite directions may be disposed on the pins 8 in mortised relation with respect to each other, and this structure permits each of the corresponding lugs 10 on said arms to be in substantial alinement which alines the corresponding springs and thus permits two direct series of springs to be disposed in the wheel side by side.

Interposed between each of the lugs 10 on the pins in the member 4 and the corresponding members 10 on the pins 8 in the members 5 are springs 12, which springs project over the lugs 10 and fit into the screw shaped grooves 11 which hold them in position.

As will be noticed from the drawings in Fig. 1, these springs 12 project in alternate order from connection with the member 4, and the member 6 and from connection with the member 6 and the member 4, and thus when any weight is brought upon the wheel, it causes all of said springs to push one against the other and with any rotary motion of the wheel all of said springs act to push one against the other, and thus compensate for any undue pulling strain which may be placed upon them by said rotary motion, and hence they will not pull loose from their moorings with the rotary motion of the wheel under power. Further, as will be seen, they will give the necessary resiliency to the wheel and will permit of such proper traction and rotary motion as they will be subjected to in operation. The rocking arms 9 also permit the springs to rock back and forth as the outer tire moves in or out, and this prevents the springs from bending, breaking or becoming crystallized, as it compensates for the changed positions of the springs in motion.

The side members 5 may carry, if desired, a solid rubber tire 13. The outer sides of the member 4 are curved, as at 14, and carry a washer 15 of felt or other suitable material to keep out dust and dirt from the space 7 and from the springs.

From the foregoing description it will readily appear that I have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described my invention, what I claim as new and useful and desire to secure by Letters Patent is:—

A device of the character described comprising a hub, spokes and felly, a tire attached to said felly, side members on said tire, pins loosely disposed through said sides, an auxiliary tire spaced from said first named tire and having side members slidable over the sides of said first named tire, said last named side members being adapted to hold said pins in place in the side members on said first named tire, bolts projected through said last named side members, lugs mounted on said pins and said bolts, and springs interposed between said lugs, as described.

In testimony whereof I affix my signature in presence of two witnesses.

DANIEL L. CROSBIE.

Witnesses:
JOHN J. BAUER,
PERCY S. WEBSTER.

---

Copies of this patent may be obtained for five cents each, by addressing the "Commissioner of Patents, Washington, D. C."